US009591223B2

(12) United States Patent
Tsuchiya

(10) Patent No.: US 9,591,223 B2
(45) Date of Patent: Mar. 7, 2017

(54) IMAGE BLUR CORRECTION APPARATUS AND IMAGING APPARATUS

(71) Applicant: OLYMPUS CORPORATION, Hachioji-shi, Tokyo (JP)

(72) Inventor: Hitoshi Tsuchiya, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/993,291

(22) Filed: Jan. 12, 2016

(65) Prior Publication Data

US 2016/0127649 A1 May 5, 2016

Related U.S. Application Data

(63) Continuation of application No. PCT/JP2014/067614, filed on Jul. 2, 2014.

(30) Foreign Application Priority Data

Jul. 22, 2013 (JP) ................. 2013-151511

(51) Int. Cl.
*H04N 5/232* (2006.01)
*G03B 5/00* (2006.01)

(52) U.S. Cl.
CPC .......... *H04N 5/23287* (2013.01); *G03B 5/00* (2013.01); *H04N 5/23258* (2013.01); *G03B 2205/0038* (2013.01)

(58) Field of Classification Search
CPC ........ H04N 5/217; H04N 5/357; H04N 5/365; H04N 5/23287; H04N 5/23258;
(Continued)

(56) References Cited

U.S. PATENT DOCUMENTS 5,237,365 A * 8/1993 Miyazawa ............. G03B 7/093
348/E5.037
6,940,542 B2 * 9/2005 Kitazawa ........... H04N 5/23248
348/208.99

(Continued)

FOREIGN PATENT DOCUMENTS

JP 05-204014 A 8/1993
JP 09-046574 A 2/1997
(Continued)

OTHER PUBLICATIONS

International Search Report mailed in corresponding International Patent Application No. PCT/JP2014/067614 on Sep. 30, 2014, consisting of 10 pp. (English translation provided).
(Continued)

*Primary Examiner* — Pritham Prabhakher
(74) *Attorney, Agent, or Firm* — Volpe and Koenig, P.C.

(57) ABSTRACT

An image blur correction apparatus includes: a blur correction actuator that corrects image blur by moving a lens or by moving an image sensor; a shake detection unit that detects a postural change amount of the imaging apparatus; a storing unit that stores three or more postural change amounts detected at different times; an estimating unit that calculates an estimate of a postural change amount after a predetermined time period on the basis of the three or more postural change amounts and on the basis of an approximation based on a temporal change in the postural change amounts; a blur amount calculating unit that calculates an image blur amount on the basis of the estimate; and a driving control unit that calculates a movement amount of a lens or image sensor to be moved by the blur correction actuator on the basis of the image blur amount.

9 Claims, 12 Drawing Sheets

(58) Field of Classification Search
CPC ........... H04N 5/23264; H04N 5/23267; H04N 5/23254; H04N 5/144; H04N 5/145; H04N 5/23277; H04N 5/2328; H04N 19/503; G06T 5/002; G06T 5/003; G06T 5/20; G06T 7/20; G03B 5/00; G03B 2205/0038; G03B 2205/0015; G03B 2205/0061; G03B 17/02; G02B 27/10; G02B 27/646; G11B 27/329; G11B 2220/61; G11B 20/10; G06F 12/08
USPC ...................................................... 348/208.4
See application file for complete search history.

(56) References Cited

U.S. PATENT DOCUMENTS

| | | | | |
|---|---|---|---|---|
| 7,907,205 | B2* | 3/2011 | Okada | G02B 7/28 348/208.99 |
| 8,111,272 | B2* | 2/2012 | Elliott | G03G 15/043 347/116 |
| 8,351,772 | B2* | 1/2013 | Wakamatsu | G03B 5/00 348/208.99 |
| 8,462,216 | B2* | 6/2013 | Sato | G03B 5/00 348/208.12 |
| 2002/0054214 | A1 | 5/2002 | Yoshikawa | |
| 2002/0163581 | A1 | 11/2002 | Kitazawa | |
| 2004/0017851 | A1 | 1/2004 | Haskell | |
| 2004/0158670 | A1 | 8/2004 | Ohbayashi | |
| 2005/0140793 | A1* | 6/2005 | Kojima | H04N 5/23287 348/208.99 |
| 2006/0104620 | A1 | 5/2006 | Ebato | |
| 2008/0136924 | A1* | 6/2008 | Washisu | G02B 27/646 348/208.2 |
| 2008/0304816 | A1 | 12/2008 | Ebato | |
| 2010/0026821 | A1 | 2/2010 | Sato | |
| 2010/0245603 | A1* | 9/2010 | Hashi | G03B 5/00 348/208.5 |
| 2010/0254688 | A1* | 10/2010 | Masuda | G03B 17/00 396/55 |
| 2011/0063458 | A1* | 3/2011 | Washisu | G03B 5/00 348/208.2 |
| 2012/0293675 | A1 | 11/2012 | Sato | |

FOREIGN PATENT DOCUMENTS

| | | |
|---|---|---|
| JP | 2002-099014 A | 4/2002 |
| JP | 2002-165127 A | 6/2002 |
| JP | 2004-241068 A | 8/2004 |
| JP | 2006-509463 A | 3/2006 |
| JP | 2006-139095 A | 6/2006 |
| JP | 2010-041245 A | 2/2010 |
| JP | 2011-145354 A | 7/2011 |
| WO | 2004054257 A | 6/2004 |

OTHER PUBLICATIONS

Written Opinion mailed in corresponding International Patent Application No. PCT/JP2014/067614 on Sep. 30, 2014, consisting of 6 pp.

* cited by examiner

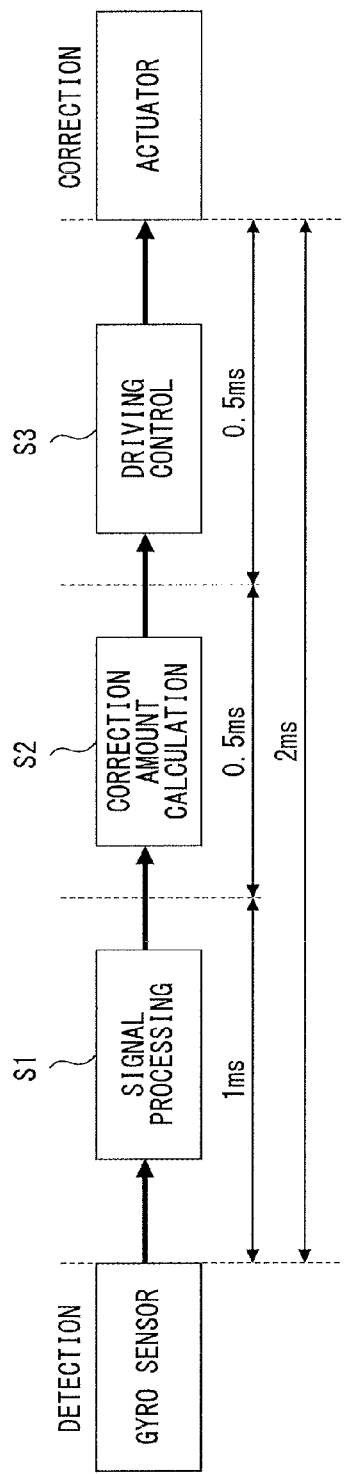
F I G. 1

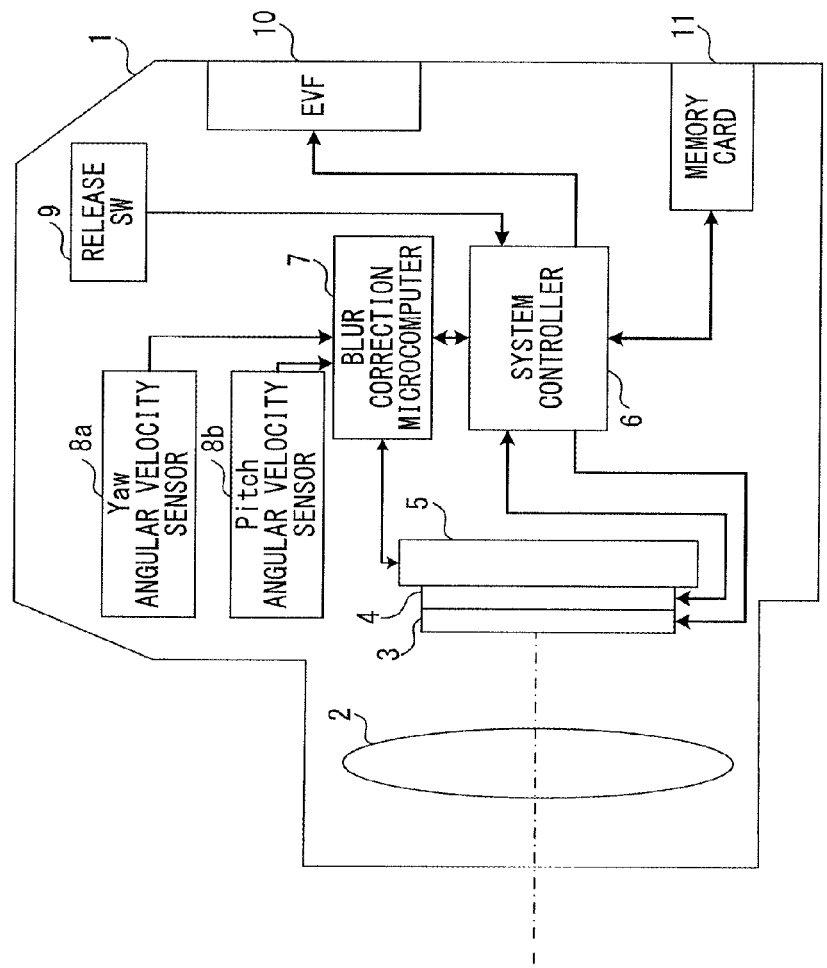
F I G. 3

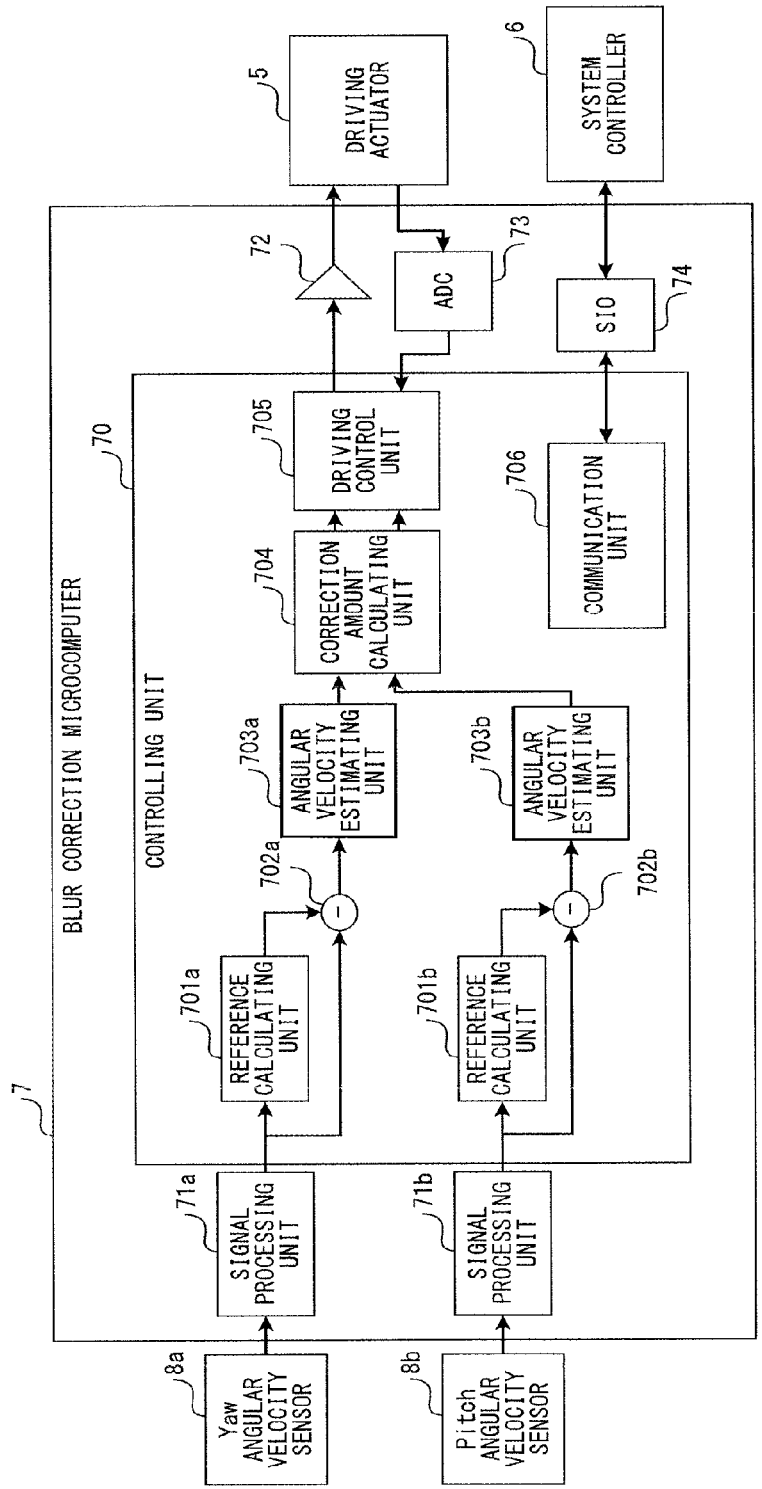
F I G. 4

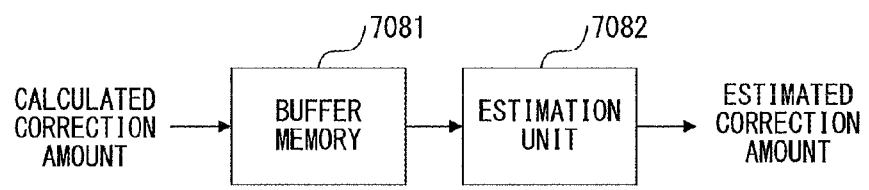
F I G. 8

IMAGE BLUR CORRECTION APPARATUS AND IMAGING APPARATUS

CROSS-REFERENCE TO RELATED APPLICATIONS

This application is based upon and claims the benefit of priority of the prior Japanese Patent Application No. 2013-151511, filed Jul. 22, 2013, the entire contents of which are incorporated herein by reference.

This is a Continuation Application of PCT Application No. PCT/JP2014/067614, filed Jul. 2, 2014, which was not published under PCT Article 21(2) in English.

FIELD

The present invention relates to an image blur correction apparatus that corrects image degradation that occurs due to image blur caused by camera shaking during image shooting, and an imaging apparatus equipped with the image blur correction apparatus.

BACKGROUND

Recently, cameras equipped with a camera shake correction function come into general use. With such a camera, even when a photographer performs image shooting by handheld, it allows the photographer to shoot images with no image blur without particularly paying attention to camera shaking.

In general, the correction capability of the camera shake correction function of a camera is indicated by the value of a shutter speed (exposure time) with which image blur can be corrected. This is represented by the ratio between a shutter speed at which the influence of image blur caused by camera shaking starts to be seen within an image that is shot without executing the camera shake correction function (this is also called a camera-shake limit shutter speed), and a shutter speed at which the influence of image blur caused by camera shaking starts to be seen within an image that is shot with the camera shake correction function executed.

In the meantime, a conventionally known mechanism for correcting camera shaking is, for example, the following. First, an image blur amount (image plane movement amount) based on a postural change in a camera body caused by camera shaking is detected by, for example, a gyro sensor that corresponds to a camera shake detection unit. Then, an image blur correction amount is calculated from the image blur amount detected by the camera shake detection unit. In addition, an image blur correction unit for making an image blur correction moves, on the basis of the calculated image blur correction amount, an optical system or an image sensor in a direction in which the image blur amount detected by the camera shake detection unit is cancelled. This suppresses image blur generated on an imaging plane.

The prior art includes the following camera shake correcting methods.

A method disclosed in patent document 1 (Japanese Laid-open Patent Publication No. 2011-145354) is provided with: an angular velocity sensor that detects camera shaking; a high-pass filter performing processing to attenuate a shake signal of a frequency lower than a first crossover frequency to the detected shake signal; a phase compensating filter compensating the phase shift of a signal which has been processed by the high-pass filter from the phase of a signal which has not been processed yet; and a blur correction unit correcting the shaking of the imaging apparatus based on the shake signal whose phase shift has been compensated by the phase compensating filter. The phase compensating filter changes the phase so as to cancel the phase shift caused by the high-pass filter, thereby preventing the phase shift from decreasing the correction capability.

According to a method disclosed in patent document 2 (Japanese Laid-open Patent Publication No. 2006-139095), an integrated value of an angular velocity is calculated by reading (sampling) the angular velocity outputs of a gyro sensor at a certain interval of time and subjecting them to time integration, and then an amount of change in integrated value is calculated from a difference between the thus calculated integrated value and the previous integrated value; based upon control time and a delay time determined by the amount of change and a blur correction module, an acceleration value is calculated in order to obtain an amount of movement of a shift lens, by which the inclination of the optical axis of the lens can be offset; subsequently, the thus calculated acceleration value is added to the integrated value calculated at this time, and then a control value for moving a shift lens is calculated using the integrated value after the addition. Driving the shift lens using the thus calculated control value obtains a blur-free photographic image.

SUMMARY

An aspect of the invention provides an image blur correction apparatus that corrects image blur that is based on a postural change in an imaging apparatus, the image blur correction apparatus including: an optical system that forms a subject image; an image sensor that captures the subject image formed by the optical system; a blur correction unit that corrects image blur by moving a lens included in the optical system vertically to an optical axis or by moving the image sensor onto an image plane; a shake detection unit that detects a postural change amount of the imaging apparatus on a cycle of a predetermined detection time; a storing unit that stores a first postural change amount detected at a first time by the shake detection unit, and a second postural change amount and third postural change amount detected at second and third times by the shake detection unit, the first time being a present time, the second and third times being different from the first time; an estimating unit that calculates a fourth postural change amount on the basis of the first, second, and third postural change amounts stored by the storing unit and on the basis of an approximation that includes a plurality of coefficients that are preset constants based on a temporal change in the postural change amounts, the fourth postural change amount being an estimate of the postural change amount achieved at a fourth time that is a predetermined time period after the first time; a blur amount calculating unit that calculates an image blur amount on the basis of the fourth postural change amount calculated by the estimating unit, the image blur amount being a movement amount of the subject image; and a driving control unit that calculates a movement amount of the lens or image sensor to be moved by the blur correction unit on the basis of the image blur amount calculated by the blur amount calculating unit, wherein the plurality of coefficients each depend on a time interval between the first and second times and a time interval between the first and third times.

Another aspect of the invention provides an image blur correction apparatus that corrects image blur that is based on a postural change in an imaging apparatus, the image blur correction apparatus including: an optical system that forms a subject image; an image sensor that captures the subject image formed by the optical system; a blur correction unit that corrects image blur by moving a lens included in the optical system vertically to an optical axis or by moving the image sensor onto an image plane; a shake detection unit that detects a postural change amount of the imaging apparatus on a cycle of a predetermined detection time; an image-plane-movement-amount detecting unit that detects an image plane movement amount that is a movement amount of the subject image that is based on the postural change amount detected by the shake detection unit; a storing unit that stores a first image plane movement amount detected at a first time by the image-plane-movement-amount detecting unit, and a second image plane movement amount and third image plane movement amount detected at second and third times by the image-plane-movement-amount detecting unit, the first time being a present time, the second and third times being different from the first time; an estimating unit that calculates a fourth image plane movement amount on the basis of the first, second, and third image plane movement amounts stored by the storing unit and on the basis of an approximation that includes a plurality of coefficients that are preset constants based on a temporal change in the image plane movement amounts, the fourth image plane movement amount being an estimate of the image plane movement amount achieved at a fourth time that is a predetermined time period after the first time; and a driving control unit that calculates a movement amount of the lens or image sensor to be moved by the blur correction actuator on the basis of the fourth image plane movement amount calculated by the estimating unit, wherein the plurality of coefficients each depend on a time interval between the first and second times and a time interval between the first and third times.

Still another aspect of the invention provides an imaging apparatus that includes any of the image blur correction apparatuses in accordance with the aspects described above.

BRIEF DESCRIPTION OF DRAWINGS

FIG. 1 illustrates examples of the flow of control and a processing time in regard to an image blur correction;

FIG. 3 illustrates an exemplary configuration of a camera that includes an image blur correction apparatus in accordance with a first embodiment;

FIG. 4 illustrates an exemplary configuration of a blur correction microcomputer in accordance with the first embodiment;

FIG. 8 illustrates an exemplary configuration of correction amount estimating unit in accordance with the second embodiment;

DESCRIPTION OF EMBODIMENTS

An image blur correction apparatus in accordance with each embodiment of the invention that will be described hereinafter corrects image blur that is based on a postural change in an imaging apparatus. First, the concept of an image blur correction made by the image blur correction apparatus of each embodiment will be described with reference to FIGS. 1 and 2.

FIG. 1 illustrates examples of the flow of control and a processing time in regard to an image blur correction.

As illustrated in FIG. 1, in the flow of control for an image blur correction, first, signal processing such as low-pass filter processing for removing noise or high-pass filter processing for removing DC components is applied to an angular velocity detected by an angular velocity sensor such as a gyro sensor (an angular velocity corresponding to camera shaking) (S1). Then, a calculation is performed such that the angular velocity to which signal processing was applied in S1 is time-integrated to determine a correction amount (S2). Subsequently, driving control is performed to move an optical system or an image sensor using an actuator on the basis of the correction amount determined from the calculation in S2 (S3). According to such a control flow, image blur amount from camera shaking is corrected.

With reference to such a control flow, assume that, as depicted in FIG. 1, 1 ms is required to perform the process of S1; 0.5 ms, the process of S2; 0.5 ms, the process of S3. This means that a processing time of 2 ms is required for the period from the detection of an angular velocity by the angular velocity sensor to the correction of image blur based on the movement of the optical system or the image sensor caused by the actuator. That is, a delay time of 2 ms occurs for the period from the detection to the correction.

Accordingly, the image blur correction apparatus in accordance with each of the embodiments described hereinafter estimates the state of camera shaking after the delay time so as to make the delay time substantially 0 and achieve a higher correction capability.

Figure 2:
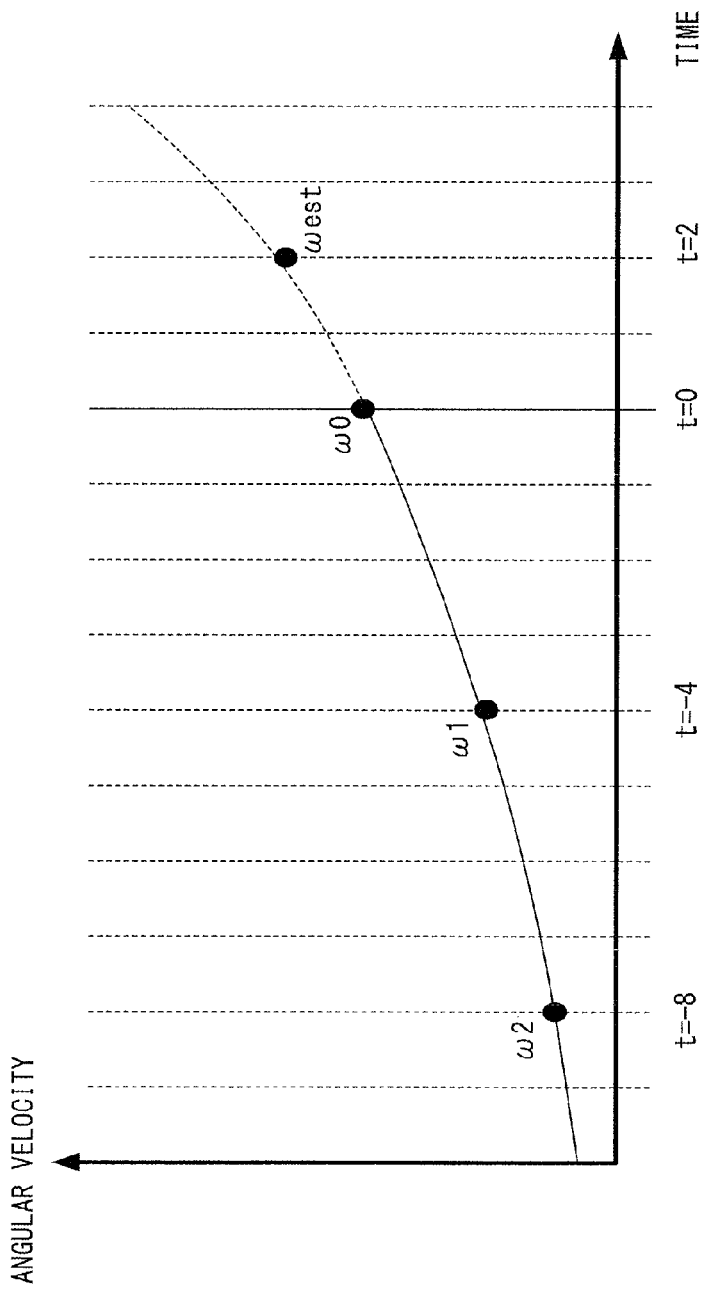
FIG. 2 illustrates an exemplary method of estimating the state of camera shaking after a delay time.

FIG. 2 illustrates an exemplary method of estimating the state of camera shaking after the delay time, and also depicts an exemplary temporal change in an angular velocity. The descriptions are based on a condition in which the state of camera shaking after a delay time of 2 ms is estimated. Another condition is such that an angular velocity is detected and a correction amount is calculated on a cycle of 1 ms.

In FIG. 2, t=0 means a reference time at which the latest angular velocity is detected, t of a negative number means a time before the reference time, and t of a positive number means a time after the reference time.

As illustrated in FIG. 2, $\omega_0$ indicates an angular velocity detected at t=0 (the latest angular velocity); $\omega_1$, an angular velocity detected at t=−4 (a time 4 ms before t=0); $\omega_2$, an angular velocity detected at t=−8 (a time 8 ms before t=0). A quadratic approximation straight line may be calculated on the basis of the three angular velocities $\omega_0$, $\omega_1$, and $\omega_0$, so that an angular velocity $\omega_{est}$ at t=2 (a time 2 ms after t=0) can be estimated according to the quadratic approximation straight line.

An approximate expression of the quadratic approximation straight line may be determined from the three angular velocities $\omega_0$, $\omega_1$, and $\omega_0$ according to the following matrix operation expression, expression (1).

$$\begin{pmatrix} \omega_0 \\ \omega_1 \\ \omega_2 \end{pmatrix} = A \begin{pmatrix} a \\ b \\ c \end{pmatrix} \quad \text{Expression (1)}$$

where $$A = \begin{pmatrix} t_0^2 & t_0 & 1 \\ t_1^2 & t_1 & 1 \\ t_2^2 & t_2 & 1 \end{pmatrix}$$

In the expression, $t_0$ indicates a time at which $\omega_0$ is detected; $t_1$, a time at which $\omega_1$ is detected; $t_2$, a time at which $\omega_t$ is detected.

On the basis of quadratic approximation coefficients, an angular velocity $\omega_{est\_x}$ at t=Xms (a time that is a period of Xms after t=0) may be determined according to the following expression, expression (2).

$$\omega_{est\_x} = X^2 a + Xb + c \quad \text{Expression (2)}$$

The following expression, expression (3), expresses an inverse matrix $A^{-1}$, which is an inverse of matrix A in expression (1)

$$A^{-1} = (1/\det A) \operatorname{adj} A \quad \text{Expression (3)}$$

detA indicates a determinant corresponding to matrix A, and adjA indicates a cofactor matrix of matrix A.

$t_0$, $t_1$, $t_2$, $\omega_0$, $\omega^1$, and $\omega_2$ are known values, and hence quadratic approximation coefficients a, b, and c may be calculated on the basis of inverse matrix $A^{-1}$ according to the following expressions, expressions (4) and (5).

$$\det A = t_0^2 * t_1 + t_1^2 * t_2 + t_2^2 * t_0 - t_2^2 * t_1 - t_1^2 * t_0 - t_0^2 * t_2 \quad \text{Expression (4)}$$

$$\frac{1}{\det A} \begin{pmatrix} t_1 - t_2, & -(t_0 - t_2), & t_0 - t_1 \\ -(t_1^2 - t_2^2), & t_0^2 - t_2^2, & -(t_0^2 - t_1^2) \\ t_1^2 * t_2 - t_2^2 * t_1, & -(t_0^2 * t_2 - t_2^2 * t_0), & t_0^2 * t_1 - t_1^2 * t_2 \end{pmatrix} \quad \text{Expression (5)}$$

$$\begin{pmatrix} \omega_0 \\ \omega_1 \\ \omega_2 \end{pmatrix} = \begin{pmatrix} a \\ b \\ c \end{pmatrix}$$

$t_0$, $t_1$, and $t_2$ are known values, and expression (4) may be represented as expression (6).

$$\det A = 128 \quad \text{Expression (6)}$$

In addition, according to $t_0$, $t_1$, $t_2$ and expression (6), expression (5) may be simplified as indicated by the following expressions, expressions (7), (8), and (9).

$$a = (4\omega_0 - 8\omega_2 + 4\omega_2)/128 = (\omega_0 - 2\omega_1 + \omega_2)/32 \quad \text{Expression (7)}$$

$$b = (48\omega_0 - 64\omega_1 + 16\omega_2)/128 = (3\omega_0 - 4\omega_1 + \omega_2)/8 \quad \text{Expression (8)}$$

$$c = \omega_0 \quad \text{Expression (9)}$$

On the basis of expressions (7), (8), and (9) and expression (2), angular velocity $\omega_{est}$, which is an estimate for 2 ms after (X=2), may be determined according to the following expression, expression (10).

$$\omega_{est} = (7\omega_0 - 10\omega_1 + 3\omega_2)/8 + \omega_0 \quad \text{Expression (10)}$$

In estimating, as described above, angular velocity $\omega_{est}$ (an estimate for 2 ms later), time intervals between $t_0$, $t_1$, and $t_2$ (times at which angular velocities $\omega_0$, $\omega_1$, and $\omega_2$ are detected) become a power of 2, so that the division in expression (10) can be replaced with a shift operation. This may suppress calculation volume and an increase in a delay time caused by calculation.

In this example, an estimation is made using an approximate expression of a quadratic polynominal, but another type of approximate expression may be used. However, in making an estimation using an approximate expression of a linear polynominal, although calculation volume for a correction amount are expected to be decreased and thus to shorten the calculation time, the expected value necessarily changes monotonously with time, and hence it should be noted that the time available to make a prediction with a small error is shortened, and only limited applications can be achieved. Meanwhile, making a prediction using an approximate expression of a cubic or greater polynominal is expected to enable a prediction with a higher precision, but it should be noted that the calculation volume for a correction amount may possibly increase, and this could lead to an increase in the calculation time depending on processing capacity. According to an experiment, in a case where the frequency range of camera shaking is 0.1 Hz to several tens of Hz, to estimate the state of camera shaking several milliseconds later, a sufficient precision can be obtained from an estimation made using an approximate expression of a quadratic polynominal, which causes light calculation volume.

In this example, the state of camera shaking is estimated by estimating an angular velocity, but the camera shaking may be estimated by estimating an image plane movement amount (the amount of movement of an image formed on an imaging plane) instead of an angular velocity. Alternatively, an acceleration sensor may be added to similarly estimate a velocity on the basis outputs from the acceleration sensor so that the state of camera shaking can be estimated from the combination of the angular velocity or image plane movement amount estimated on the basis of outputs from the angular velocity sensor and the velocity estimated on the basis of outputs from the acceleration sensor. Alternatively, an acceleration sensor may be provided instead of the angular velocity sensor, and the state of camera shaking may be estimated by similarly estimating a velocity on the basis of outputs from the acceleration sensor.

With reference to a first embodiment, the following will describe an example in which the state of camera shaking is estimated by estimating an angular velocity on the basis of an output from an angular velocity sensor. In addition, with reference to a second embodiment, descriptions will be given of an example in which the state of camera shaking is estimated by estimating an image plane movement amount on the basis of an output from the angular velocity sensor. Moreover, with reference to a third embodiment, descriptions will be given of an example in which the state of camera shaking is estimated from the combination of an angular velocity estimated on the basis of an output from the angular velocity sensor and a velocity estimated on the basis of an output from an acceleration sensor.

First Embodiment

FIG. 3 illustrates an exemplary configuration of a camera that includes an image blur correction apparatus in accordance with a first embodiment of the invention.

As illustrated in FIG. 3, a camera 1 includes an optical system 2, a focal plane shutter (hereinafter simply referred to as a shutter) 3, an image sensor 4, a driving actuator 5, a system controller 6, a blur correction microcomputer 7, angular velocity sensors 8, a release SW (switch) 9, an EVF (Electronic View Finder) 10, and a memory card 11. The camera 1 is an exemplary imaging apparatus.

The optical system 2 forms a subject image. More particularly, the optical system 2 forms, as a subject image, an image on an image plane of the image sensor 4 from a light flux coming from the direction of an external optical axis.

Under the control of the system controller 6, the shutter 3 puts the image sensor 4 in an exposed state or a shielded state by performing an opening/closing operation in front of the image sensor 4.

Under the control of the system controller 6, the image sensor 4 captures and converts the subject image formed on the image plane by the optical system 2 into an electric signal. The system controller 6 reads the resultant signal as an image signal.

In the present embodiment, exposure control is performed using the shutter 3, which is a mechanical shutter, but exposure control may be performed using what is called an electronic shutter, i.e., a shutter with which exposure control is performed by providing an imaging control signal to the image sensor 4.

In addition to the reading of the image signal above, the system controller 6 performs various types of control related to the functions of the entirety of the camera. As an example, control may be performed such that an image signal read from the image sensor 4 is output after being converted into an image in a format for the EVF 10. As another example, control may be performed such that an image signal read in image shooting is recorded into the memory card 11 as a shot image data. This control is performed according to detection of the release SW 9. As still another example, comprehensive control may be performed by communicating with the blur correction microcomputer 7.

The EVF 10 is a display device such as a liquid crystal display device. For example, the EVF 10 may display an image signal output from the system controller 6 in a manner such that a photographer can visually check the image.

The release SW 9 is an operation unit used by a photographer to perform an image shooting operation. The release SW 9 identifies and detects a two-stage operation of a half-pressing operation (1st release) and a full-pressing operation (2nd release), and outputs a signal based on the detection result to the system controller 6.

The memory card 11 is an erasable programmable read-only memory attachable to the camera 1 and has shot image data and the like recorded therein.

The angular velocity sensors 8 (8a, 8b) are sensors (e.g., gyro sensors) that detect a rotational motion associated with a postural change in the camera. The angular velocity sensors 8 detect, as an angular velocity, a temporal change in an angle made by a rotational motion, and output the angular velocity to the blur correction microcomputer V. An angular velocity sensor 8a detects a rotation motion in a Yaw direction made by the camera 1, and an angular velocity sensor 8b detects a rotation motion in a Pitch direction made by the camera 1. In the present embodiment, the angular velocity sensors 8 are examples of a shake detection unit that detects a postural change amount of the camera 1.

Under the control of the system controller 6, the blur correction microcomputer 7 calculates a blur amount from an output from the angular velocity sensors 8 (8a, 8b) as a movement amount of a subject image formed by the image sensor 4, and outputs to the driving actuator 5 a control signal for moving the image sensor 4 in a direction in which the blur amount is cancelled. It should be noted that, to provide the control signal, consideration is also given to the position of the image sensor 4 in accordance with a position detection signal output from the driving actuator 5.

The driving actuator 5 supports and moves the image sensor 4 in an X direction (horizontal direction) and a Y direction (vertical direction) under the control of the blur correction microcomputer 7 (in accordance with a control signal from the blur correction microcomputer 7). This may cause the image sensor 4 to move in a direction in which a blur amount on the imaging plane is cancelled, thereby preventing blur that would be generated in a shot image data. The driving actuator 5 detects the position of the image sensor 4 and outputs a corresponding position detection signal to the blur correction microcomputer 7. The driving actuator 5 is an example of a blur correction actuator that corrects image blur by moving the image sensor 4 onto an image plane.

FIG. 4 illustrates an exemplary configuration of the blur correction microcomputer 7.

As illustrated in FIG. 4, the blur correction microcomputer 7 includes a control unit 70, signal processing units 71 (71a, 71b), a driver 72, an ADC (Analog/Digital Converter) 73, and a SIO (Serial Input/Output) 74. The control unit 70 includes reference calculating units 701 (701a, 701b), subtraction units 702 (702a, 702b), angular velocity estimating units 703 (703a, 703b), a correction amount calculating unit 704, a driving control unit 705, and a communication unit 706.

The signal processing unit 71a applies signal processing, including analog/digital converting processing, low-pass filter processing, and high-pass filter processing, to an analog signal that is an output signal (angular velocity detection signal) of the angular velocity sensor 8a. Similarly, the signal processing unit 71b applies signal processing, including analog/digital converting processing, low-pass filter processing, and high-pass filter processing, to an analog signal that is an output signal (angular velocity detection signal) of the angular velocity sensor 8b. The signal processing units 71a and 71b each perform signal processing on a cycle corresponding to a predetermined sampling rate. For example, the signal processing may be performed on a cycle of 1 ms, where the sampling rate is 1 kHz. Signal processing performed by the signal processing units 71a and 71b may be, for example, analog/digital converting processing only.

The reference calculating unit 701a calculates a reference value on the basis of an output signal of the signal processing unit 71a. The reference value is based on a signal output from the angular velocity sensor 8a when the camera 1 is in a still state. More particularly, the reference calculating unit 701a calculates an average (time average) of the values of angular velocities detected during a predetermined time period in which the camera 1 is in the still state, and defines this average as a reference value. However, the method of calculating a reference value is not limited to this, and, as long as a reference value with a small error can be calculated, any method can be used. Similarly, the reference calculating unit 701*b* calculates a reference value on the basis of an output signal of the signal processing unit 71*b*.

The subtraction unit 702*a* subtracts the output signal (reference value) of the reference calculating unit 701*a* from the output signal (angular velocity) of the signal processing unit 71*a* so as to output a signal for an angular velocity having a sign. Similarly, the subtraction unit 702*b* subtracts the output signal (reference value) of the reference calculating unit 701*b* from the output signal (angular velocity) of the signal processing unit 71*b* so as to output a signal for an angular velocity having a sign. The sign of a detected angular velocity may be used as a rotation direction of the angular velocity.

On the basis of an output signal of the subtraction unit 702*a* (also referred to as an input angular velocity) and on the basis of an approximation that is based on a temporal change in an angular velocity, the angular velocity estimating unit 703*a* calculates an estimate (also referred to as an estimated angular velocity) of an angular velocity (angular velocity in the Yaw direction) after a predetermined time period. Similarly, on the basis of an output signal of the subtraction unit 702*b* (also referred to as an input angular velocity) and on the basis of an approximation that is based on a temporal change in an angular velocity, the angular velocity estimating unit 703*b* calculates an estimate (also referred to as an estimated angular velocity) of an angular velocity (angular velocity in the Pitch direction) after a predetermined time period. The predetermined time period corresponds to, for example, the period of processing time from the detection of the angular velocity to the correction of image blur.

Figure 5:
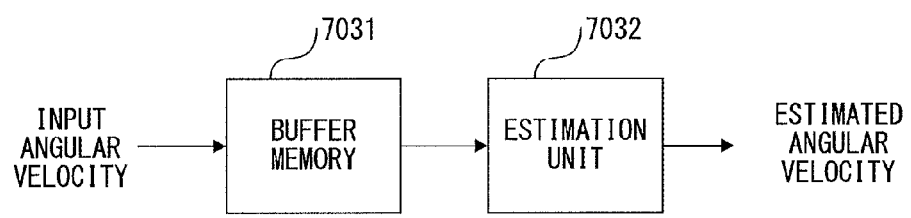
FIG. 5 illustrates an exemplary configuration of an angular velocity estimating unit in accordance with the first embodiment.

More particularly, the angular velocity estimating units 703*a* and 703*b* each include a buffer memory 7031 and an estimation unit 7032, as depicted in FIG. 5. Descriptions will be given of an example in regard to only the angular velocity estimating unit 703*a* herein.

The buffer memory 7031 stores three or more input angular velocities that correspond to three or more angular velocities detected at different times by the angular velocity sensor 8*a*. The buffer memory 7031 stores, for example, three or more input angular velocities that correspond to three or more angular velocities detected by the angular velocity sensor 8*a* during a period of time beginning at a predetermined point before the present time and extending up to the present time. The three or more input angular velocities are, for example, nine input angular velocities that correspond to nine angular velocities detected on a cycle of 1 ms during the period extending from the detection of the latest angular velocity to 8 ms before the detection, and such input angular velocities are updated on a cycle of 1 ms. The buffer memory 7031 is an exemplary storing unit that stores three or more postural change amounts detected at different times by the angular velocity sensor 8*a*.

On the basis of three or more input angular velocities stored by the buffer memory 7031 and on the basis of an approximation that is based on a temporal change in an angular velocity, the estimation unit 7032 calculates an estimate (estimated angular velocity) of an angular velocity (angular velocity in the Yaw direction) after a predetermined time period. For example, on the basis of three input angular velocities $\omega_0$, $\omega_1$, and $\omega_2$ stored by the buffer memory 7031 and on the basis of expression (10), which is an approximation based on a temporal change in the angular velocity, the estimation unit 7032 may calculate an estimate $\omega_{est}$ of the angular velocity 2 ms later, which corresponds to a delay time. In this case, input angular velocity $\omega_0$ corresponds to the latest angular velocity, input angular velocity $\omega_1$ corresponds to an angular velocity 4 ms (4 cycles) before the detection of the latest angular velocity, and input angular velocity $\omega_2$ corresponds to an angular velocity 8 ms (8 cycles) before the detection of the latest angular velocity.

The correction amount calculating unit 704 calculates a correction amount (image blur amount) for the X direction on the basis of an estimate calculated by the angular velocity estimating unit 703*a*, and calculates a correction amount (image blur amount) for the Y direction on the basis of an estimate calculated by the angular velocity estimating unit 703*b*. More particularly, the correction amount calculating unit 704 includes, for example, the configuration of an angular-blur correction unit 7044 included in a correction amount calculating unit 704 described hereinafter with reference to FIG. 12. The correction amount calculating unit 704 calculates the correction amount (image blur amount) for the X direction by performing a multiple operation using a parameter based on a lens characteristic (focal length, image magnification) and a value obtained by time-integrating an output signal (estimate) from the angular velocity estimating unit 703*a*. The correction amount calculating unit 704 also calculates the correction amount (image blur amount) for the Y direction by performing a multiple operation using a parameter based on a lens characteristic (focal length, image magnification) and a value obtained by time-integrating an output signal (estimate) from the angular velocity estimating unit 703*b*.

On the basis of the X-direction correction amount (image blur amount) calculated by the correction amount calculating unit 704, the driving control unit 705 calculates the amount of X-direction movement of the image sensor 4 to be caused by the driving actuator 5. On the basis of the Y-direction correction amount (image blur amount) calculated by the correction amount calculating unit 704, the driving control unit 705 calculates the amount of Y-direction movement of the image sensor 4 to be caused by the driving actuator 5. More particularly, on the basis of, for example, the X-direction correction amount and Y-direction correction amount calculated by the correction amount calculating unit 704, the driving control unit 705 determines a destination position to which the image sensor 4 is to be moved by the driving actuator 5. On the basis of the destination position and a signal that is based on a position detection signal output from the driving actuator 5, feedback control is performed while outputting a drive signal for causing the driving actuator 5 to move the image sensor 4 to the destination position. In this way, the driving control unit 705 performs closed-loop control to control the movement of the image sensor 4, but the driving control unit 705 may perform, for example, open-loop control to control the movement of the image sensor 4.

The driver 72 converts a drive signal from the driving control unit 705 into a signal in a form for driving the driving actuator 5, and outputs the converted signal. This causes the driving actuator 5 to move the image sensor 4 in accordance with the input drive signal, with the result that blur is prevented from being generated within a shot image data.

The ADC 73 converts, into a digital signal, an analog signal output as a position detection signal from the driving actuator 5, and outputs the converted signal to the driving control unit 705

The communication unit 706 controls the SIO 74, which is a serial input-output interface, so as to communicate with (e.g., transmit/receive commands to/from) an external device (system controller 6).

As described above, using the blur correction microcomputer 7 described above using FIGS. 4 and 5, an angular velocity after a predetermined time period (e.g., later 2 ms) is estimated, and image blur is corrected on the basis of the estimation, thereby compensating for the influence of a delayed response caused by, for example, a delay time that occurs during the process from detection to correction, which was described above with reference to FIG. 1.

Figure 6:
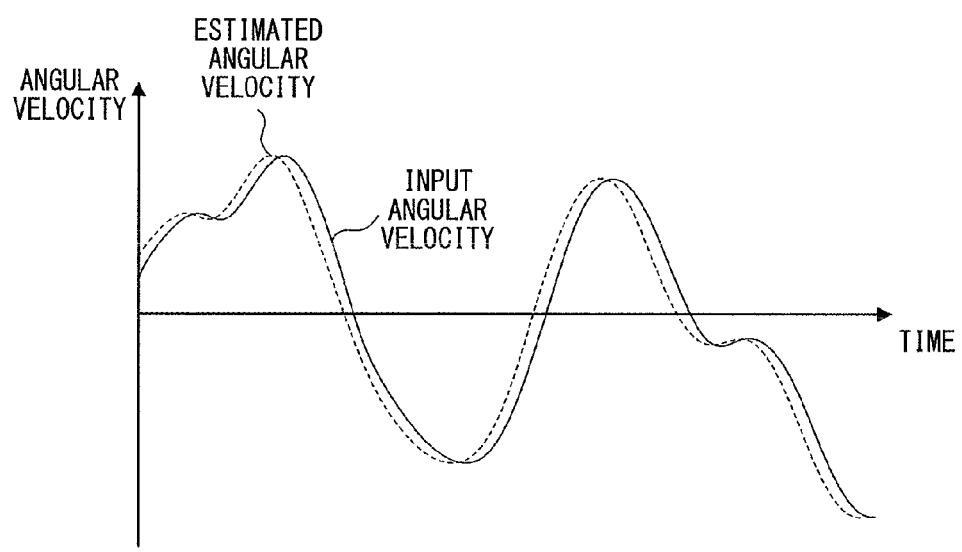
FIG. 6 illustrates an exemplary relationship between a temporal change in an input angular velocity and a temporal change in an estimated angular velocity in regard to the angular velocity estimating unit in accordance with the first embodiment.

FIG. 6 illustrates an exemplary relationship between a temporal change in an input angular velocity and a temporal change in an estimated angular velocity in regard to the angular velocity estimating unit 703 (703*a* or 703*b*).

In FIG. 6, an estimated angular velocity for an arbitrary time is an estimate of an angular velocity 2 ms later that is calculated by the angular velocity estimating unit 703 on the basis of expression (10) (an angular velocity 2 ms (2 cycles) after the time at which a latest angular velocity is detected), where ω0 represents an input angular velocity for that arbitrary time that corresponds to the latest angular velocity, ω1 represents an input angular velocity that corresponds to an angular velocity 4 ms (4 cycles) before the time at which the latest angular velocity is detected, and ω2 represents an input angular velocity that corresponds to an angular velocity 8 ms (8 cycles) before the time at which the latest angular velocity is detected.

As depicted in FIG. 6, according to calculation performed by the angular velocity estimating unit 703, the temporal change in estimated angular velocity precedes the temporal change in input angular velocity by 2 ms.

The fact that an estimation error that is a difference between an estimated angular velocity and an angular velocity 2 ms later is sufficiently small relative to a difference between a current angular velocity and the angular velocity 2 ms later clarifies that a decrease in the correction capability caused by a delay is suppressed.

Accordingly, the image blur correction apparatus in accordance with the present embodiment estimates an angular velocity after a predetermined time period (e.g., 2 ms later) through simple calculations, and calculates a correction amount on the basis of the estimate so as to suppress an increase in calculation time, thereby shorting a delay time that occurs during the period from detection of blur to correction thereof, so that the correction capability can be prevented from being decreased due to a delay in response.

Second Embodiment

A camera that includes an image blur correction apparatus in accordance with a second embodiment of the present invention is different from a camera that includes the image blur correction apparatus in accordance with the first embodiment, in terms of the configuration and operation of the blur correction microcomputer. Accordingly, the camera that includes the image blur correction apparatus in accordance with the present embodiment is described herein mainly with regard to such differences. The present embodiment is described with like components given like reference marks to those described with reference to the first embodiment.

The configuration of the camera 1 that includes the image blur correction apparatus in accordance with the present embodiment is similar to that of the camera 1 illustrated in FIG. 3, and descriptions thereof are omitted herein.

Figure 7:
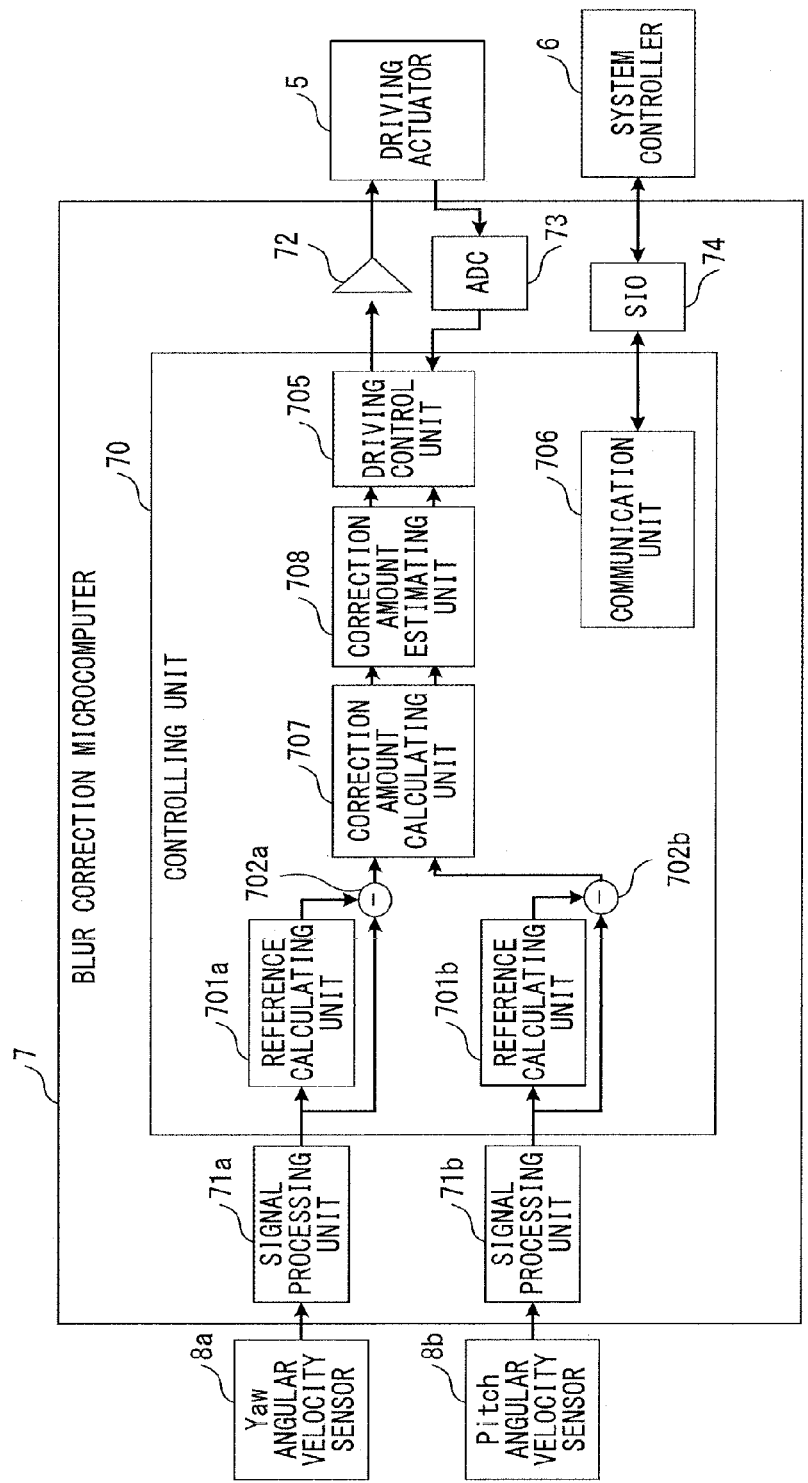
FIG. 7 illustrates an exemplary configuration of a blur correction microcomputer in accordance with a second embodiment.

FIG. 7 illustrates an exemplary configuration of the blur correction microcomputer 7 included in the camera 1 that includes the image blur apparatus in accordance with the embodiment.

The blur correction microcomputer 7 depicted in FIG. 7 is different from that depicted in FIG. 4 in the sense that the blur correction microcomputer 7 depicted in FIG. 7 includes a correction amount calculating unit 707 and a correction amount estimating unit 708 instead of the angular velocity estimating units 703 (703*a*, 703*b*) and correction amount calculating unit 704 included in the blur correction microcomputer 7 depicted in FIG. 4.

The correction amount calculating unit 707 includes, for example, the configuration of an angular blur correction unit 7044 (illustrated in FIG. 12, which will be described hereinafter) included in the correction amount calculating unit 704. The correction amount calculating unit 707 calculates a correction amount (image plane movement amount) for an X direction by performing a multiply operation using a parameter based on a lens characteristic (focal length, image magnification) and a value obtained by time-integrating an output signal (angular velocity) from the subtraction unit 702*a*. The correction amount calculating unit 707 calculates a correction amount (image plane movement amount) for a Y direction by performing a multiply operation using a parameter based on a lens characteristic (focal length, image magnification) and a value obtained by time-integrating an output signal (angular velocity) from the subtraction unit 702*b*. In the present embodiment, the correction amount calculating unit 707 is an example of a shake detection unit that detects an image plane movement amount that is based on a postural change in the imaging apparatus.

On the basis of an output signal of the correction amount calculating unit 707 (calculated correction amount for the X direction) and on the basis of an approximation that is based on a temporal change in correction amount, the correction amount estimating unit 708 calculates an estimate (also referred to as an estimated correction amount) of a correction amount for the X direction (image plane movement amount) after a predetermined time period. On the basis of an output signal of the correction amount calculating unit 707 (calculated correction amount for the Y direction) and on the basis of an approximation that is based on a temporal change in correction amount, the correction amount estimating unit 708 calculates an estimate (also referred to as an estimated correction amount) of a correction amount for the Y direction (image plane movement amount) after a predetermined time period. The predetermined time period corresponds to, for example, the period of processing time from the detection of an angular velocity or calculation of an image plane movement amount to the correction of image blur.

More particularly, for each of the X and Y directions, the correction amount estimating unit 708 includes a buffer memory 7081 and an estimation unit 7082, as depicted in FIG. 8. Descriptions will be given herein of an example in regard to only the buffer memory 7081 and estimation unit 7082 provided for the X direction.

The buffer memory 7081 holds three or more X-direction correction amounts calculated at different times by the correction amount calculating unit 707. The buffer memory 7081 holds, for example, three or more X-direction correction amounts detected by the correction amount calculating unit 707 during a period of time beginning at a predetermined point before the present time and extending up to the present time. The three or more X-direction correction amounts are, for example, nine X-direction correction amounts that correspond to nine X-direction correction amounts detected on a cycle of 1 ms during the period extending from the calculation of the latest X-direction correction amount to 8 ms before the calculation, and such X-direction correction amounts are updated on a cycle of 1 ms. The buffer memory 7081 is an exemplary storing unit that stores three or more image plane movement amounts based on angular velocities detected at different times by the angular velocity sensor 8a.

On the basis of three or more X-direction correction amounts stores by the buffer memory 7081 and on the basis of an approximation that is based on a temporal change in correction amount, the estimation unit 7082 calculates an estimate of an X-direction correction amount after a predetermined time period. For example, on the basis of three X-direction correction amounts stored by the buffer memory 7081 and on the basis of an approximation based on a temporal change in correction amount, the estimation unit 7082 may calculate an estimate of the X-direction correction amount 2 ms later, which corresponds to a delay time. In this case, the three X-direction correction amounts stored by the buffer memory 7081 are the latest X-direction correction amount, the X-direction correction amount calculated 4 ms (4 cycles) before the calculation of the latest X-direction correction amount, and the X-direction correction amount calculated 8 ms (8 cycles) before the calculation of the latest X-direction correction amount. The approximation based on a temporal change in correction amount is an approximate expression of a quadratic polynominal developed using a method similar to the method of developing expression (10).

The other components in the blur correction microcomputer 7 depicted in FIG. 7 are similar to those depicted in FIG. 4, and descriptions thereof are omitted herein.

As described above, using the blur correction microcomputer 7 described above with reference to FIGS. 7 and 8, a correction amount (image plane movement amount) after a predetermined time period (e.g., 2 ms later) is estimated, and image blur is corrected on the basis of the estimation, thereby compensating for the influence of a delayed response caused by, for example, a delay time that occurs during the process from detection to correction, which was described above with reference to FIG. 1.

Figure 9:
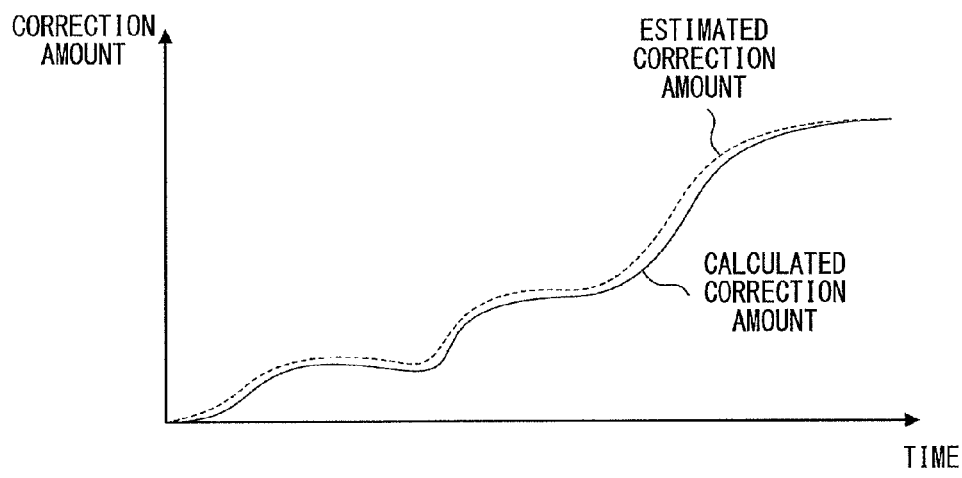
FIG. 9 illustrates, for an X direction or a Y direction, an exemplary relationship between a temporal change in a calculated correction amount and a temporal change in an estimated correction amount in regard to a correction amount estimating unit in accordance with the second embodiment.

FIG. 9 illustrates, for an X direction or a Y direction, an exemplary relationship between a temporal change in calculated correction amount and a temporal change in estimated correction amount in regard to the correction amount estimating unit 708.

In FIG. 9, an estimated correction amount for an arbitrary time is an estimate of a correction amount 2 ms later (2 ms (2 cycles) after the arbitrary time) that is calculated by the correction amount estimating unit 708 on the basis of an approximation based on a temporal change in correction amount (approximate expression of a quadratic polynominal developed using a method similar to the method of developing expression (10)), by using a calculated correction amount for that arbitrary time (assume that this is the latest correction amount), a calculated correction amount 4 ms (4 cycles) before the calculation of the latest correction amount, and a calculated correction amount 8 ms (8 cycles) before the calculation of the latest correction amount.

As depicted in FIG. 9, according to calculation performed by the correction amount estimating unit 708, the temporal change in estimated correction amount precedes the temporal change in calculated correction amount by 2 ms.

Accordingly, the image blur correction apparatus in accordance with the present embodiment estimates a correction amount (image plane movement amount) after a predetermined time period (e.g., 2 ms later) through simple calculations on the basis of a correction amount (image plane movement amount) calculated according to an output signal from the angular velocity sensors 8, so as to suppress an increase in calculation time, thereby shorting a delay time that occurs during the period from detection of blur to correction thereof, so that the correction capability can be prevented from being decreased due to a delay in response.

According to the image blur correction apparatus in accordance with the embodiment, the correction amount estimating unit 708 calculates an estimate after the correction amount calculating unit 707 performs time integration. Hence, even when high frequency noise has been mixed with an output signal from the subtraction unit 702, the time integration performed by the correction amount calculating unit 707 decreases the influence of the high frequency noise, thereby preventing an estimation error caused by the high frequency noise from increasing. This is because, in the calculation for the time integration performed by the correction amount calculating unit 707, a gain in a transfer characteristic changes inversely with a frequency (similar to a gain transfer characteristic of an integration circuit) so that high frequency noise that could be mixed with an output signal from the subtraction unit 702 can be suppressed.

Third Embodiment

A camera that includes an image blur correction apparatus in accordance with a third embodiment of the present invention is different from a camera that includes the image blur correction apparatus in accordance with the first embodiment in the sense that it further includes an acceleration sensor, and the configuration and operation of the blur correction microcomputer are different because of the acceleration sensor. Accordingly, the camera that includes the image blur correction apparatus in accordance with the present embodiment is described herein mainly with regard to such differences. The present embodiment is described with like components given like reference marks to those described with reference to the first embodiment.

Figure 10:
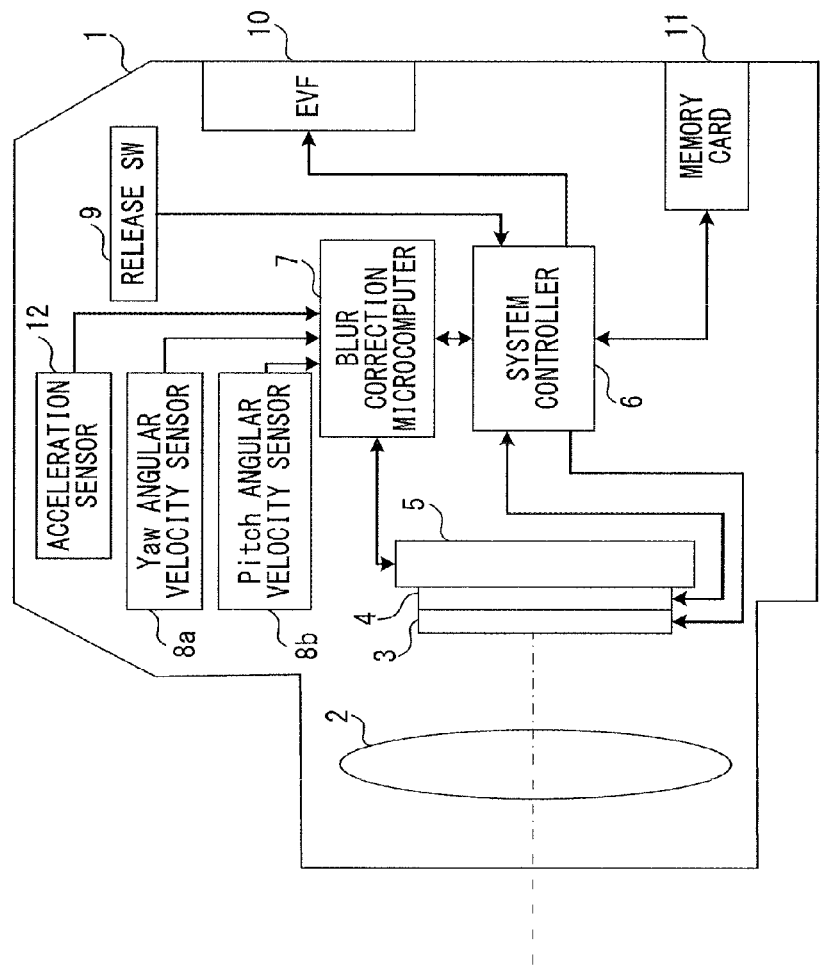
FIG. 10 illustrates an exemplary configuration of a camera that includes an image blur correction apparatus in accordance with a third embodiment.

FIG. 10 illustrates an exemplary configuration of a camera that includes an image blur correction apparatus in accordance with the present embodiment.

A camera 1 depicted in FIG. 10 is different from the camera 1 depicted in FIG. 3 in the sense that the former camera 1 further includes an acceleration sensor 12. The acceleration sensor 12 detects an acceleration of the camera 1 for each of an X direction, Y direction, and Z direction of the camera 1, and outputs the acceleration to a blur correction microcomputer 7. The Z direction of the camera 1 is the direction of an optical axis of the camera 1, the X direction of the camera 1 is a horizontal direction of the camera 1, and the Y direction of the camera 1 is a vertical direction of the camera 1.

The other components in the camera 1 depicted in FIG. 10 are similar to those depicted in FIG. 3, and descriptions thereof are omitted herein.

Figure 11:
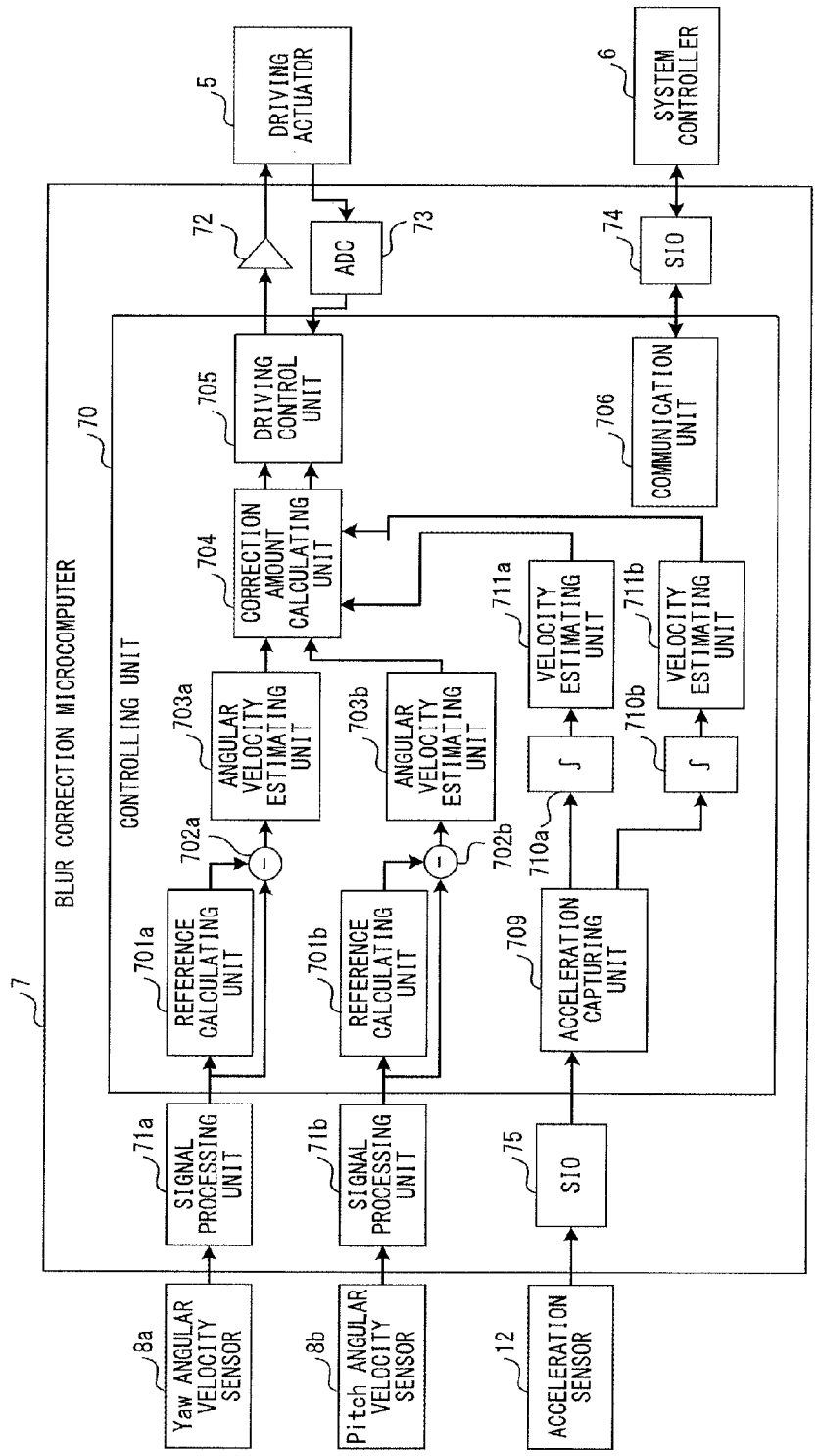
FIG. 11 illustrates an exemplary configuration of a blur correction microcomputer in accordance with the third embodiment.

FIG. 11 illustrates an exemplary configuration of the blur correction microcomputer 7 included in the camera 1 that includes the image blur correction apparatus in accordance with the present embodiment.

The blur correction microcomputer 7 depicted in FIG. 11 is different from the blur correction microcomputer 7 depicted in FIG. 4 in the sense that the former blur correction microcomputer 7 further includes a SIO 75 and that the control unit 70 further includes an acceleration capturing unit 709, integration operation units 710 (710a, 710b), and velocity estimating units 711 (711a, 711b).

The acceleration capturing unit 709 controls the SIO 75, which is a serial input-output interface, so as to read an output signal from the acceleration sensor 12, and obtains an X-direction acceleration and a Y-direction acceleration from the output signal. Note that the output signal from the acceleration sensor 12 is a digital signal. Such a signal is output from the acceleration sensor 12 after a reference value is subtracted therefrom within the acceleration sensor 12. The reference value refers to, for example, the average (time average) of the values of accelerations detected by the acceleration sensor 17 during a predetermined time period in which an acceleration is not applied to the camera 1 (e.g., resting state). Consequently, the value of an acceleration based on an output signal from the acceleration sensor 12 becomes 0 while an acceleration is not applied to the camera 1. While an acceleration is being applied to the camera 1, the value of an acceleration based on an output signal from the acceleration sensor 12 has a sign that depends on the direction.

In the present embodiment, as described above, an output signal from the acceleration sensor 12 is input to the acceleration capturing unit 709 via the SIO 75. However, for example, an acceleration sensor that outputs an analog signal as the output signal may be provided instead of the acceleration sensor 12, and an ADC may provided instead of the SIO 75.

The integration operation unit 710a calculates a moving velocity for the X direction by time-integrating the X-direction acceleration obtained by the acceleration capturing unit 709. Similarly, the integration operation unit 710b calculates a moving velocity for the Y direction by time-integrating the Y-direction acceleration obtained by the acceleration capturing unit 709.

On the basis of an output signal from the integration operation unit 710a (X-direction moving velocity) and on the basis of an approximation that is based on a temporal change in moving velocity, the velocity estimating unit 711a calculates an estimate of an X-direction moving velocity after a predetermined time period. Similarly, on the basis of an output signal from the integration operation unit 710b (Y-direction moving velocity) and on the basis of an approximation that is based on a temporal change in moving velocity, the velocity estimating unit 711b calculates an estimate of a Y-direction moving velocity after a predetermined time period. The velocity estimating units 711 (711a, 711b) calculate an estimate in a manner similar to the manner in which the angular velocity estimating units 703 (703a, 703b) calculate an estimate. However, the estimates need to be calculated in synchrony with the angular velocity estimating units 703. In, for example, a case where the period of a reading time of the acceleration capturing unit 709 is longer than a processing time of the signal processing unit 71 by about 1 ms, the velocity estimating unit 711 (711a, 711b) desirably estimates a value (velocity) after a predetermined time period plus 1 ms in consideration of the fact that the angular velocity estimating unit 703 (703a, 703b) estimates a value (angular velocity) after the predetermined time period. In, for example, a case where the angular velocity estimating unit 703 (703a, 703b) estimates a value (angular velocity) 2 ms later, the velocity estimating unit 711 (711a, 711b) desirably estimates a value (velocity) 3 ms (2 ms+1 ms) later.

In accordance with such a configuration, the correction amount calculating unit 704 depicted in FIG. 11 calculates an X-direction correction amount (image blur amount) on the basis of an estimate calculated by the angular velocity estimating unit 703a and an estimate calculated by the velocity estimating unit 711a. The correction amount calculating unit 704 depicted in FIG. 11 also calculates a Y-direction correction amount (image blur amount) on the basis of an estimate calculated by the angular velocity estimating unit 703b and an estimate calculated by the velocity estimating unit 711b.

The other components in the blur correction microcomputer 7 depicted in FIG. 11 are similar to those depicted in FIG. 4, and descriptions thereof are omitted herein.

Figure 12:
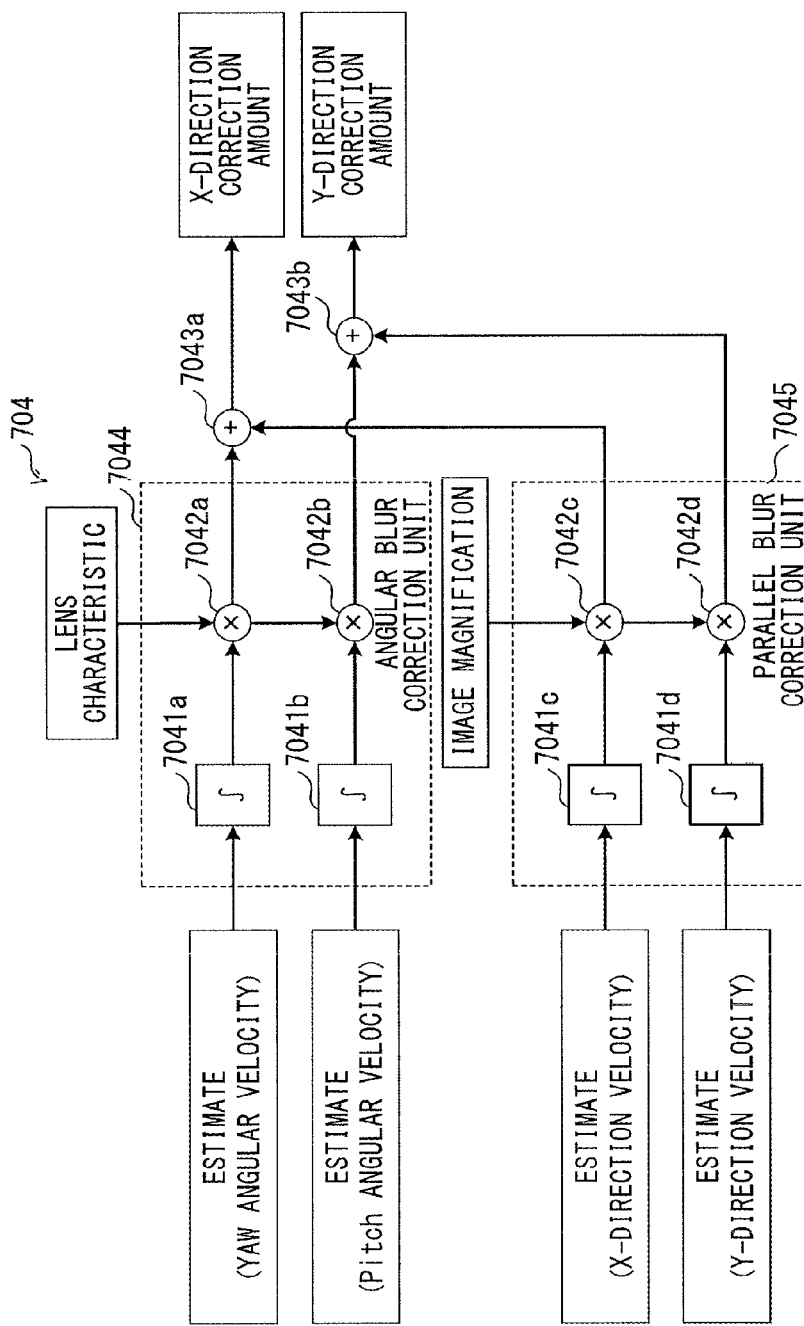
FIG. 12 illustrates an exemplary configuration of a correction amount calculating unit in accordance with the third embodiment.

FIG. 12 illustrates an exemplary configuration of the correction amount calculating unit 704 depicted in FIG. 11.

As illustrated in FIG. 12, the correction amount calculating unit 704 includes integration operation units 7041 (7041a, 7041b, 7041c, 7041d), multipliers 7042 (7042a, 7042b, 7042c, 7042d), and adders 7043 (7043a, 7043b).

In the correction amount calculating unit 704, the integration operation units 7041a and 7041b and the multipliers 7042a and 7042b are also components of the angular blur correction unit 7044. The integration operation units 7041c and 7041d and the multipliers 7042c and 7042d are also components of a parallel blur correction unit 7045.

In the angular blur correction unit 7044, the integration operation unit 7041a time-integrates an output signal from the angular velocity estimating unit 703a (estimate (Yaw-direction angular velocity)) so as to determine an amount of an angle change for the Yaw direction that is made with a rotation of the camera 1. Similarly, the integration operation unit 7041b time-integrates an output signal from the angular velocity estimating unit 703b (estimate (Pitch-direction angular velocity)) so as to determine an amount of an angle change for the Pitch direction that is made with a rotation of the camera 1.

The multiplier 7042a calculates an amount of blur (image plane movement amount) that has been made in the X direction on an imaging plane according to the following multiplication, expression (11), by using the amount of a Yaw-direction angle change determined by the integration operation unit 7041a and a lens-characteristic-based parameter (focal length, image magnification) provided by, for example, the system controller 6.

$$\delta = (1+\beta) \cdot f \cdot \tan \theta \qquad \text{Expression (11)}$$

δ: Image plane movement amount
f: Focal length
θ: Amount of angle change
β: Image magnification (ratio of the size of an imaging plane relative to the size of a subject image)

As is clear from expression (11), a greater focal length (f) and/or image magnification (β) lead to a larger amount of image plane movement (δ) made per unit time. This is also true for a situation in which a postural change in the camera 1 remains the same. Accordingly, even blur with a high frequency and small amplitude may become non-negligible depending on some conditions such as telephotographic shooting (i.e., shooting with a long focal length (f)) and closeup shooting (i.e., shooting with large image magnification (β)), and this means that the advantage of estimation-based delay shortening is large.

As with the multiplier 7042a, the multiplier 7042b calculates an amount of blur (image plane movement amount) that has been made in the Y direction on an imaging plane according to expression (11) by using the amount of a Pitch-direction angle change determined by the integration operation unit 7041b and a lens-characteristic-based parameter (focal length, image magnification) provided by, for example, the system controller 6.

Meanwhile, in the parallel blur correction unit 7045, the integration operation unit 7041c time-integrates an output signal from the velocity estimating unit 711a (estimate (X-direction velocity)) so as to determine a parallel movement amount for the X direction that is associated with a parallel movement of the camera 1. Similarly, the integration operation unit 7041*d* time-integrates an output signal from the velocity estimating unit 711*b* (estimate (Y-direction velocity)) so as to determine a parallel movement amount for the Y direction that is associated with a parallel movement of the camera 1. The multiplier 7042*c* calculates an amount of blur (image plane movement amount) that has been made in the X direction on the imaging plane, by multiplying the parallel movement amount for the X direction determined by the integration operation unit 7041*c* by a lens-characteristic-based parameter (image magnification) provided by, for example, the system controller 6. Similarly, the multiplier 7042*d* calculates an amount of blur (image plane movement amount) that has been made in the Y direction on an imaging plane, by multiplying the parallel movement amount for the Y direction determined by the integration operation unit 7041*d* by a lens-characteristic-based parameter (image magnification) provided by, for example, the system controller 6.

The adder 7043*a* adds the X-direction blur amount (image plane movement amount) calculated by the multiplier 7042*a* to the X-direction blur amount (image plane movement amount) calculated by the multiplier 7042*c*, and outputs the sum. Similarly, the adder 7043*b* adds the Y-direction blur amount (image plane movement amount) calculated by the multiplier 7042*b* to the Y-direction blur amount (image plane movement amount) calculated by the multiplier 7042*d*, and outputs the sum.

The image blur correction apparatus in accordance with the present embodiment estimates a velocity and angular velocity after a predetermined time period, and calculates a correction amount on the basis of the estimates, so that, for both angular blur and translational blur, the correction capability can be prevented from being decreased due to a delay in response.

The camera 1 that includes the image blur correction apparatus in accordance with the present embodiment is different from the camera 1 that includes the image blur correction apparatus in accordance with the first embodiment in the sense that it further includes the acceleration sensor 12, and the configuration and operation of the blur correction microcomputer 7 are different because of the acceleration sensor 12. However, for example, the camera 1 that includes the image blur correction apparatus in accordance with the present embodiment may be different from the camera 1 that includes the image blur correction apparatus in accordance with the second embodiment in the sense that it further includes the acceleration sensor 12, and the configuration and operation of the blur correction microcomputer 7 may be different because of the acceleration sensor 12. In this case, for example, the acceleration sensor 12, SIO 75, acceleration capturing unit 709, integration operation units 710 (710*a*, 710*b*), and velocity estimating units 711 (711*a*, 711*b*) depicted in FIG. 11 may be added to the configuration illustrated in FIG. 7, and an output from the velocity estimating units 711 (711*a*, 711*b*) and an output from the correction amount estimating unit 708 depicted in FIG. 7 may be summed and input to the driving control unit 705

Descriptions have been given of a camera that includes the image blur correction apparatus in accordance with each of the first to third embodiments, but the camera that includes the image blur correction apparatus in accordance with each of the embodiments may have various variations.

According to the camera that includes the image blur correction apparatus in accordance with each of the embodiments, the driving actuator 5 corrects image blur by moving the image sensor 4 onto an image plane. However, the driving actuator 5 may correct image blur by moving a lens included in the optical system 2 in a direction vertical to the optical axis. In this case, the driving actuator 5 is an example of a blur correction actuator that corrects image blur by moving a lens included in an optical system in a direction vertical to an optical axis.

The embodiments of the present invention are not limited to those described above, and the invention may be embodied in an implementation phase with components modified without departing from the spirit of the invention. Various inventions may be formed by properly combining a plurality of components disclosed with reference to the embodiments. For example, some of the components of any of the embodiments may be deleted. In addition, components from different embodiments may be properly combined.

The present invention can provide a camera shaking correction apparatus and an imaging apparatus provided therewith, wherein the state of camera shaking after a delay time resulting from a camera shaking correction can be precisely estimated in simple calculation so as to make up for the delay time, thereby achieving a high correction capability.

What is claimed is:

1. An image blur correction apparatus that corrects image blur that is based on a postural change in an imaging apparatus, the image blur correction apparatus comprising:
    an optical system that forms a subject image;
    an image sensor that captures the subject image formed by the optical system;
    a blur correction actuator that corrects image blur by moving a lens included in the optical system vertically to an optical axis or by moving the image sensor onto an image plane;
    a shake detection sensor that detects a postural change amount of the imaging apparatus on a cycle of a predetermined detection time;
    a memory that stores a first postural change amount detected at a first time by the shake detection sensor, and a second postural change amount and third postural change amount detected at second and third times by the shake detection sensor, the first time being a present time, the second and third times being different from the first time;
    a processor executing instructions, stored on the memory, to:
        calculate a fourth postural change amount on the basis of the first, second, and third postural change amounts stored by the memory and on the basis of an approximation that includes a plurality of coefficients that are preset constants based on a temporal change in the postural change amounts, the fourth postural change amount being an estimate of the postural change amount achieved at a fourth time that is a predetermined time period after the first time;
        calculate an image blur amount on the basis of the calculated fourth postural change amount, the image blur amount being a movement amount of the subject image; and
        calculate a movement amount of the lens or image sensor to be moved by the blur correction actuator on the basis of the calculated image blur amount, wherein the plurality of coefficients each depend on a time interval between the first and second times and a time interval between the first and third times.

2. The image blur correction apparatus according to claim 1, wherein
the estimate calculated at the fourth time corresponds to a value after a period of processing time extending from the first time at which the shake detection sensor performs the detecting to a time at which the blur correction actuator performs the correcting.

3. The image blur correction apparatus according to claim 1, wherein
a time interval between the second time and the first time and a time interval between the first time and the third time are each a power of 2 relative to the cycle of the predetermined detection time, and
the first, second, and third times are times at which the shake detection sensor detects the three postural change amounts to be used to calculate the approximation.

4. The image blur correction apparatus according to claim 1, wherein
the shake detection sensor includes
an angular velocity sensor that detects, on the cycle of the predetermined detection time, an angular velocity associated with a postural change in a rotation made by the imaging apparatus in a pitch direction or yaw direction with a rotational axis-vertical to a direction of an optical axis of the optical system, and
an acceleration sensor that detects, on the cycle of the predetermined detection time, an acceleration associated with a postural change in a parallel movement of the imaging apparatus in a vertical direction or horizontal direction with respect to the direction of the optical axis of the optical system, wherein
the processor executes instructions, stored on the memory, to calculate, on the cycle of the predetermined detection time, a moving velocity associated with the postural change in the parallel movement of the imaging apparatus by performing an integration operation of the acceleration detected by the acceleration sensor, wherein
the postural change amount is a state amount consisting of the angular velocity and the moving amount,
the memory stores a first angular velocity detected at a first time by the angular velocity sensor, and a second angular velocity and third angular velocity detected at second and third times by the angular velocity sensor, the first time being a present time, the second and third times being different from the first time, and stores a first moving velocity, a second moving velocity, and a third moving velocity respectively calculated at the first, second, and third times,
the processor executes instructions, stored on the memory to
calculate a fourth angular velocity on the basis of the first, second, and third angular velocities stored by the memory and on the basis of an approximation that includes preset coefficients based on a temporal change in the angular velocity, the fourth angular velocity being an estimate of the angular velocity achieved at a fourth time that is a predetermined time period after the first time, and
calculate a fourth moving velocity on the basis of the first, second, and third moving velocities stored by the memory and on the basis of an approximation that includes preset coefficients based on a temporal change in the moving velocities, the fourth traveling velocity being an estimate of the traveling velocity achieved at a fourth time that is a predetermined time period after the first time, wherein
calculate an image blur amount on the basis of an estimate consisting of the calculated fourth angular velocity and the calculated fourth moving velocity.

5. An image blur correction apparatus that corrects image blur that is based on a postural change in an imaging apparatus, the image blur correction apparatus comprising:
an optical system that forms a subject image;
an image sensor that captures the subject image formed by the optical system;
a blur correction actuator that corrects image blur by moving a lens included in the optical system vertically to an optical axis or by moving the image sensor onto an image plane;
a shake detection sensor that detects a postural change amount of the image sensor on a cycle of a predetermined detection time;
an image-plane-movement-amount detector unit that detects an image plane movement amount that is a movement amount of the subject image that is based on the postural change amount detected by the shake detection sensor;
a memory that stores a first image plane movement amount detected at a first time by the image-plane-movement-amount detector, and a second image plane movement amount and third image plane movement amount detected at second and third times by the image-plane-movement-amount detector, the first time being a present time, the second and third times being different from the first time;
a processor executing instructions, store on the memory, to:
calculate a fourth image plane movement amount on the basis of the first, second, and third image plane movement amounts stored by the memory and on the basis of an approximation that includes a plurality of coefficients that are preset constants based on a temporal change in the image plane movement amounts, the fourth image plane movement amount being an estimate of the image plane movement amount achieved at a fourth time that is a predetermined time period after the first time; and
calculate a movement amount of the lens or image sensor to be moved by the blur correction actuator on the basis of the calculated fourth image plane movement amount, wherein
the plurality of coefficients each depend on a time interval between the first and second times and a time interval between the first and third times.

6. The image blur correction apparatus according to claim 5, wherein
the estimate calculated at the fourth time corresponds to a value after a period of processing time extending from the first time at which the shake detection sensor or the image-plane-movement-amount detector performs the detecting to a time at which the blur correction actuator performs the correcting.

7. The image blur correction apparatus according to claim 5, wherein
a time interval between the second time and the first time and a time interval between the first time and the third time are each a power of 2 relative to the cycle of the predetermined detection time, and
the first, second, and third times are times at which the the image-plane-movement-amount detector detects the three image plane movement amounts to be used to calculate the approximation.

8. An imaging apparatus comprising:
the image blur correction apparatus according to claim 1.

9. An imaging apparatus comprising:
the image blur correction apparatus according to claim 5.

* * * * *